Oct. 6, 1970     W. J. KRONSCHNABEL     3,532,365
COUPLING
Filed Jan. 22, 1969
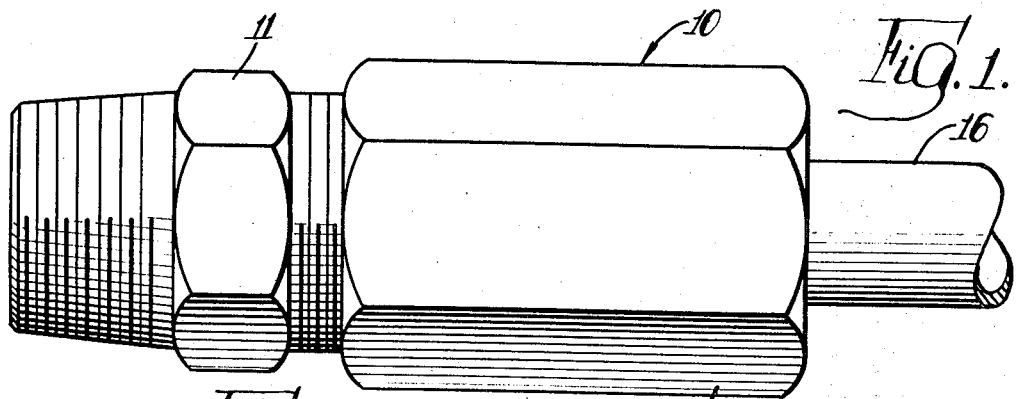
Fig. 1.
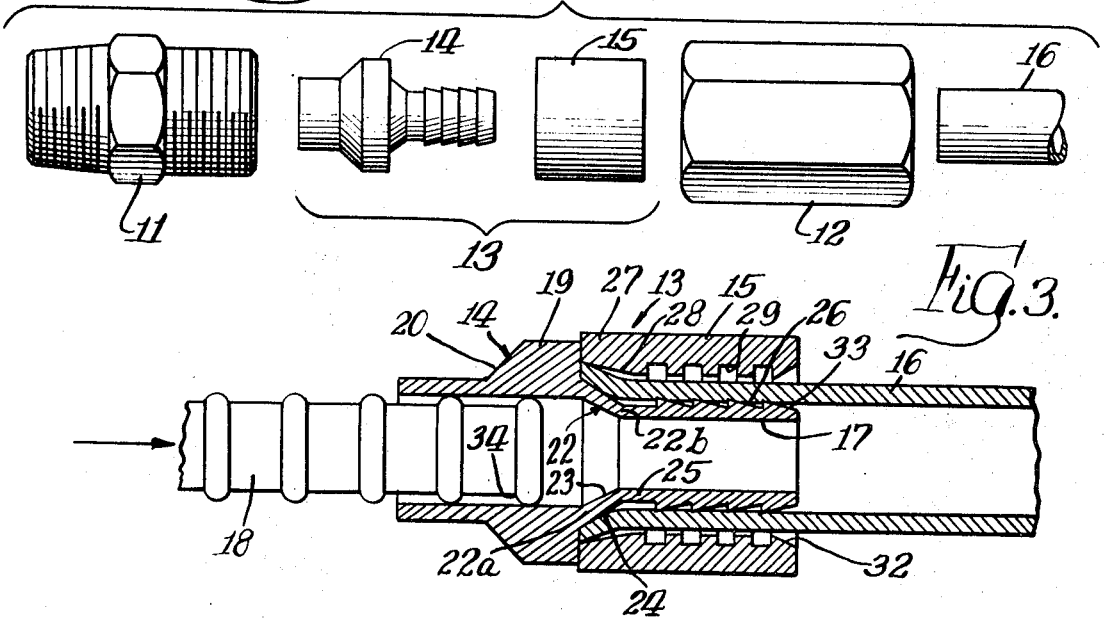
Fig. 2.
Fig. 3.
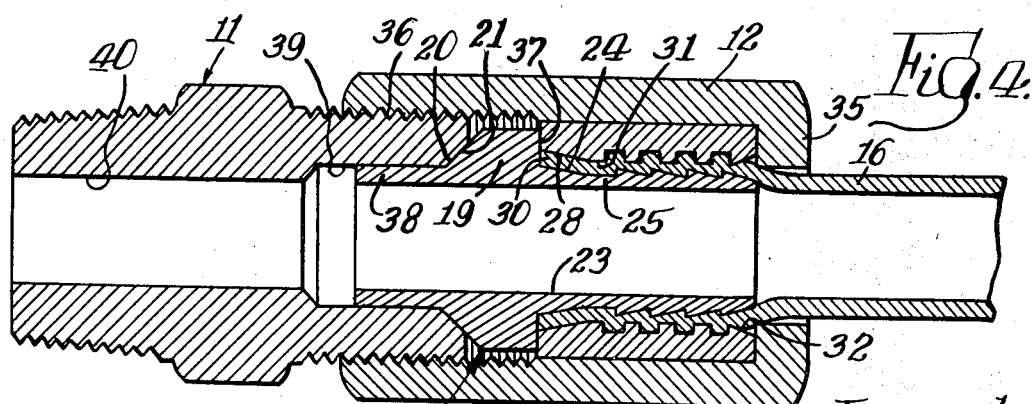
Fig. 4.
Inventor:-
William J. Kronschnabel,
By Hofgren, Wegner, Allen,
Stellman & McCord Attys.

3,532,365
Patented Oct. 6, 1970

3,532,365
COUPLING
William J. Kronschnabel, Manitowoc, Wis., assignor to
I-T-E Imperial Corporation, a corporation of Delaware
Filed Jan. 22, 1969, Ser. No. 792,993
Int. Cl. F16l 33/20
U.S. Cl. 285—258    8 Claims

ABSTRACT OF THE DISCLOSURE

A full flow coupling for connection to the end of a duct such as a tube or hose, including an insert portion which is radially expanded to clamp the duct end against an outer shell. The coupling further includes a body member and a nut member removably associated with the attachment structure defined by the insert and shell. The insert includes a gripping portion connected to a base portion by a thin frustoconical wall with the gripping portion and wall being concurrently expanded to the final configuration so as to provide a substantially constant internal diameter within the insert in the attached arrangement of the attachment structure. The shell and insert cooperate to effect a flare in the duct end. The shell is arranged to be engaged by the nut member and bear against the base portion of the insert to urge the insert sealingly against the body member in the made-up arrangement of the coupling.

BACKGROUND OF THE INVENTION

Field of the invention

This invention relates to fittings and, in particular, to a coupling for sealed attachment to the end of a duct such as a tube or hose.

Description of the prior art

In one form of known coupling for use with ducts such as tubes or hoses, an insertion portion is radially expanded to compress the duct end against an outer shell portion. The insert and outer shell portions may be provided with ribs or teeth to assist in the retention of the duct and in association with the made-up fitting. The known fittings have the serious disadvantage of inability to retain a plastic duct end against blow-out from the fitting under high pressure and vibration.

One highly desirable use of plastic tubing is in automotive systems such as in the brake systems thereof. It is necessary to positively maintain the tubing in such systems against blow-out from the couplings. The known fittings had not proven sufficiently reliable in such duty and thus the highly desirable use of plastic tubes in such applications has been limited.

SUMMARY OF THE INVENTION

The present invention comprehends an improved expansible insert coupling which eliminates the disadvantages of the above discussed known couplings in a novel and simple manner. The invention comprehends the provision in such a coupling having a body member and a nut member, of an attachment structure adapted to be sealingly secured to the end of a tubular duct and subsequently sealingly retained between the body member and nut member thereby to sealingly couple the duct. The attachment structure comprises a tubular insert member having a substantially rigid base portion abutting the body member, an expansible gripper portion adapted to be received within the duct end, and a connecting portion comprising a frusto-conical wall having its large diameter end connected to said base portion, the inside diameter of said large end being substantially equal to the inside diameter of the base portion. The inside diameter of the small end is substantially equal to the inside diameter of the unexpanded gripper portion, and the thickness of the wall is substantially less than the thickness of said gripper portion. A tubular shell is spaced radially outwardly of the gripper portion to receive the duct end therebetween, the shell being rigid whereby radial expansion of the gripper portion compresses the duct end between said gripper portion and shell and sealingly locks said attachment to the duct end. The shell extends between the nut member and the base portion of the insert whereby advance of the nut member toward the body member urges the base portion sealingly against the body member. The wall and gripper portion have an inside diameter substantially equal to the inside diameter of said base portion in the attached arrangement of said attachment.

More specifically, the invention comprehends such a coupling structure wherein the shell is provided with an outwardly flared surface at the inner end arranged to cause the duct end to be flared outwardly in the attached arrangement of the attachment to provide improved holding power in the coupling.

Still further more specifically, the arrangement comprehends the provision of such a structure wherein the insert has an inside diameter substantially equal to the inside diameter of the duct thereby to provide a full-flow coupling.

BRIEF DESCRIPTION OF THE DRAWING

Other features and advantages of the invention will be apparent from the following description taken in connection with the accompanying drawings wherein:

FIG. 1 is a side elevation of the coupling embodying the invention secured to the end of a tubular duct;

FIG. 2 is an exploded side elevation thereof;

FIG. 3 is a diametric section of the attachment structure in place on the end of the duct prior to the expansion of the insert portion thereof; and FIG. 4 is a diametric section of the coupling structure with the attachment installed on the duct and disposed between the nut member and body member in a made-up arrangement of the coupling.

DESCRIPTION OF THE PREFERRED EMBODIMENT

An exemplary embodiment of the invention is shown in the drawing. A four-part coupling generally designated 10 is shown to include a body member 11, a nut member 12, and an attachment structure 13 comprising an insert member 14 and a shell 15. The coupling 10 is adapted to be sealingly connected to the end of a duct such as tube end 16, which illustratively may comprise a plastic tube end, a hose end, etc.

The attachment structure 13 is adapted to be permanently installed on the duct end 16 by means of a radial expansion of a gripper portion 17 of the insert 14 to compress the duct end between the gripper portion 17 and the outwardly circumjacent shell 15. The expansion of the gripper portion 17 may be effected by a suitable forming tool such as a swaging tool 18 illustrated in FIG. 3. The insert 14 includes a base portion 19 which is substantially rigid, being relatively thick both axially and radially. Base portion 19 defines a frusto-conical axially inwardly widening annular seal surface 20 adapted to have surface engagement with a corresponding frusto-conical annular surface 21 on the axially inner end of the body member 11 (FIG. 4).

Insert 14 further includes a connecting portion 22 comprising a thin wall extending between the base portion 19 and gripper portion 17. As best seen in FIG. 3, the wall 22 is defined by an inner surface 23 which is frusto-conical narrowing axially inwardly, and an outer surface 24 which is frusto-conical narrowing axially inwardly. The outer surface 24 extends at a slightly greater angle to the axis of the insert than does surface 23 whereby the wall thickness decreases inwardly. The inner diameter of the outer end 22a of wall 22 is substantially equal to the inner diameter of the base portion 19. The inner diameter of the inner end 22b of the wall 22 is substantially equal to the inner diameter of the gripper portion 17. The wall 22 may be provided with a tubular extension 25 joining the inner end 22b to the gripper portion. The outer surface of the gripper portion may be provided with a plurality of saw-tooth ribs 26 for improved gripping coaction with the inner surface of the tube 16.

The shell 15 is preferably relatively rigid so as to provide a backup about the duct end upon expansion of the gripper portion 17, thereby to retain the duct end compressively therebetween. The shell includes an axially outer end 27 defined by a frusto-conical inwardly narrowing surface 28. The shell further is provided with a plurality of inwardly facing grooves 29 into which the duct is forced as the result of expansion of the insert gripper portion 17 to provide a positive interlocked association of the duct end with the shell.

As best seen in FIG. 3, the angularity of surface 28 relative to the axis of the coupling is less than the angularity of surface 24. In the illustrated embodiment, the angle of convergence of surfaces 24 and 23 is similar to the angle of surface 28 relative to the axis of the coupling so that in the attached arrangement of the attachment 13, as shown in FIG. 4, the surface 24 is substantially parallel to the surface 28, the surface 23 being substantially parallel to the axis of the coupling in this arrangement. Resultingly, as shown in FIG. 4, the end portion 30 of the tube 16 is flared outwardly to provide a further enhancement of the gripping action of the attachment portion 13 on the tube end. As shown in FIG. 3, the axial length of the shell 15 may be substantially equal to the cumulative axial length of the wall 22 including the extension 25 and the gripper portion 17. As best seen in FIG. 4, the shell may include a short right circularly annular surface 31 extending axially inwardly from the inner end of the surface 28 whereby the extension 25 effectively serves to clamp a portion of the duct end 16 therebetween.

The axially inner end of the shell may be provided with a flared entrance surface 32 for facilitating the movement of the tube end into the shell. Similarly, the gripper portion 17 may be provided with a flared entrance surface 33 for facilitating the movement of the gripper portion into the tube end.

The attachment portion 13 is sealingly secured to the end of the tube 16 by expanding the gripper portion 17 as by the swaging tool 18 being moved axially through the insert portion with the duct end and shell disposed in concentric surrounding relationship, as shown in FIG. 3. The connecting portion 22 and extension 25 are relatively thin and permit ready expansion thereof as the tool 18 moves therepast to engage the gripper portion 17. The tool may be provided with a plurality of bearing surfaces 34 having an outside diameter substantially equal to the inside diameter of the base portion 19 so that movement of the tool 18 axially through the insert causes the internal diameter of the wall 22, extension 25, and gripper portion 17 to be substantially equal to the internal diameter of the base portion 19. Further, the internal diameter of the base portion 19 is preferably similar to the internal diameter of the duct 16 so that the flow passage remains full through the attachment 13 in the attached arrangement of the structure as shown in FIG. 4. Further, as shown in FIG. 4, the expansion of the insert causes the ribs 26 to bite into the inner wall of the duct 16 and urge portions of the outer wall thereof into the grooves 29. Thus, the duct tube end is effectively positively retained in association with the attachment portion 13 against blow-out therefrom notwithstanding high pressures and vibration.

The nut member 12 includes an axially inner flange 35 which bears against the axially inner end of the shell as the nut member is advanced on a threaded portion 36 of the body member to urge the shell against an outer surface 37 of the base portion 19 and thereby urge the insert axially to sealingly engage surface 20 thereof with surface 21 of the body member. The insert 14 may include an axially outer extension 38 received within axially inner portion 39 of bore 40 extending coaxially through the body member 11. The extension 38 has an outside diameter substantially equal to the diameter of portion 39. Bore 40 preferably has a diameter substantially equal to the inner diameter of duct end 16 whereby the entire coupling provides a full flow passage for effective maximum efficiency in the transmission of fluid therethrough.

The installation of coupling 10 is extremely simple. The user merely firstly moves the nut member 12 over the end of the duct 16 sufficiently to permit the placement of the shell 15 about the end and the insertion of the gripper portion 17 into the end of the duct 16, as shown in FIG. 3. As discussed above, the swaging tool 18 is then employed to expand the insert to the configuration of FIG. 4, thereby the attachment portion 13 is effectively positively sealingly secured to the end of the tube. The thin wall 22 provides for facilitated expansion of the insert and the cooperating frusto-conical surfaces 24 and 28 provide for improved enhanced gripping action on the tube end. The nut member is then brought to the position of FIG. 4 wherein the flange 35 abuts the inner end of the shell and the make-up of the coupling is completed by the threading of the nut member onto the body member 11 to complete the seal of the attachment portion 13 to the body member.

The structure of coupling 10 has been found to provide long trouble-free life in such severe duty applications as brake systems of automotive equipment such as trucks and the like. The coupling 10 is extremely simple and economical of manufacture and yet provides the highly desirable advantages discussed above. As the attachment 13 is permanently installed on the duct, the fitting may be readily made and remade as desired without affecting the seal of the attachment portion to the duct end.

While I have shown and described one embodiment of my invention, it is to be understood that it is capable of many modifications. Changes, therefore, in the construction and arrangement may be made without departing from the spirit and scope of the invention as defined in the appended claims.

I claim:

1. In a coupling having a body member and a nut member, attachment structure adapted to be sealingly secured to the end of a tubular duct and be sealingly retained between the body member and nut member thereby to sealingly couple the duct, said attachment structure comprising:

a tubular insert member having a substantially rigid base portion abutting the body member;

an expansible gripper portion adapted to be received within the duct end;

a connecting portion comprising a frusto-conical wall having its large end connected to said base portion, the inside diameter of said large end being substantially equal to the inside diameter of said base portion, said wall having its small end connected to said gripper portion, the inside diameter of said small end being substantially equal to the inside diameter of the unexpanded gripper portion, the thickness of said wall being substantially less than the thickness of said base portion;

and a tubular shell spaced radially outwardly of said gripper portion and adapted to receive the duct end therebetween, said shell being rigid whereby radial expansion of the gripper portion compresses said duct end between said gripper portion and shell and sealingly locks said attachment to the duct end, said shell extending between the nut member and said base portion of the insert whereby advance of the nut member toward the body member urges said base portion sealingly against said body member, said wall and said gripper portion having an inside diameter substantially equal to the inside diameter of said base portion in the attached arrangement of said attachment structure.

2. The coupling structure of claim 1 wherein said shell has an axial length substantially equal to the cumulative axial length of said frusto-conical wall and gripper portion of the insert member.

3. The coupling structure of claim 1 wherein said shell has an axially outer end spaced radially outwardly of said wall of the insert member and defining a frusto-conical axially inwardly narrowing surface whereby the duct end is flared outwardly between said wall and outer end surface in the attached arrangement of said attachment.

4. The coupling structure of clim 1 wherein said wall tapers in thickness away from said base portion.

5. The coupling structure of claim 1 wherein said wall defines an outer surface extending substantially parallel to the cooperating inner surface of the shell in the attached arrangement of the attachment.

6. The coupling structure of claim 1 wherein said insert includes a thin connection of said wall and gripper portion.

7. The coupling structure of claim 6 wherein said connection has a thickness substantially equal to the minimum thickness of said wall.

8. The coupling structure of claim 1 wherein the thickness of said wall is substantially less than the thickness of said gripper portion.

References Cited

UNITED STATES PATENTS

| | | | |
|---|---|---|---|
| 1,098,265 | 5/1914 | James | 285—258 X |
| 1,098,294 | 5/1914 | Patty | 285—249 |
| 2,262,228 | 11/1941 | Garretson | 285—258 |
| 2,433,425 | 12/1947 | Burckle | 285—382.4 X |

FOREIGN PATENTS

| | | |
|---|---|---|
| 512,654 | 5/1955 | Canada. |
| 1,170,729 | 5/1964 | Germany. |
| 685,355 | 3/1965 | Italy. |

DAVE W. AROLA, Primary Examiner

U.S. Cl. X.R.

285—334.5